Sept. 27, 1955 W. GERECKE 2,718,882
CYLINDER HEAD FOR DIESEL ENGINES
Filed Oct. 3, 1952
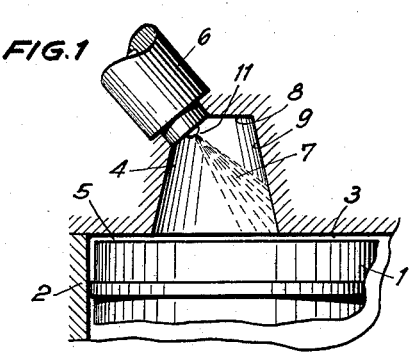
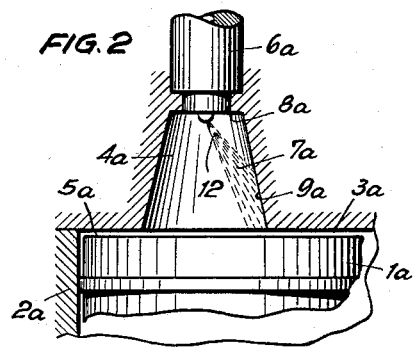
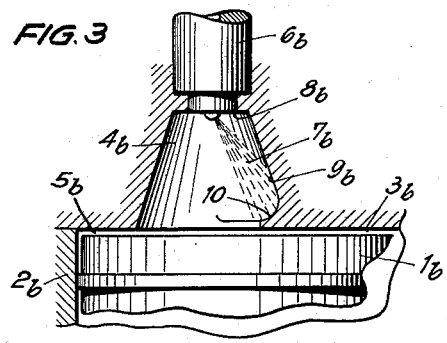
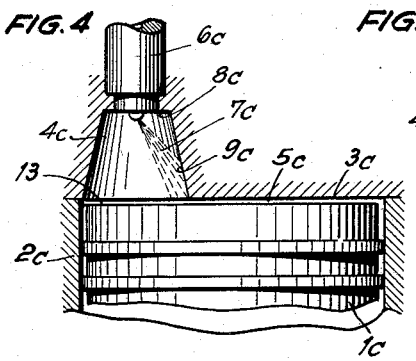
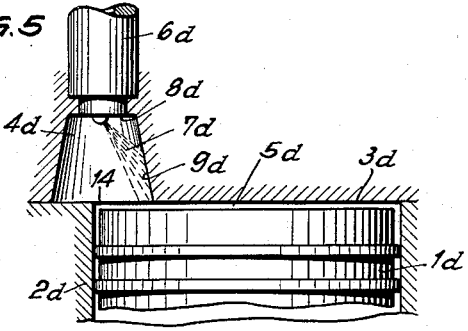
INVENTOR
Walter Gerecke
By
Walter Berken
Patent Agent

United States Patent Office 2,718,882
Patented Sept. 27, 1955

2,718,882

CYLINDER HEAD FOR DIESEL ENGINES

Walter Gerecke, Koln-Sulz, Germany, assignor to Klöckner - Humboldt - Deutz Aktiengesellschaft, Koln, Germany Application October 3, 1952, Serial No. 312,974

Claims priority, application Germany December 15, 1951

9 Claims. (Cl. 123—32)

The present invention relates to diesel engines and, more particularly, concerns a cylinder head for diesel engines which cylinder head is provided with a combustion chamber arranged laterally of the central longitudinal axis of the cylinder on which it is mounted and adapted at the upper dead center of the working piston of said cylinder to receive nearly the total combustion air, said combustion chamber being in a non-throttled communication with the cylinder chamber of said cylinder and having the fuel injected into said combustion chamber by a single-hole nozzle.

In the combustion chamber of a diesel engine of the above mentioned type there will, at the end of a compressing stroke, occur a whirling movement of the combustion air. This whirling movement of the combustion air is caused by the fact that the air between the bottom of the cylinder head and the top of the piston is displaced into the combustion chamber. Since, when considering the opening through which the combustion chamber communicates with the cylinder chamber, the greater portion of the bottom surface of the cylinder head is located on that side of the combustion chamber which is adjacent the longitudinal axis of the cylinder, the combustion air will flow strongest from the last mentioned side into the combustion chamber.

Starting from the above mentioned facts, it is an object of the present invention, further to improve the combustion process of diesel engines of the above mentioned type.

It is a further object of this invention to provide a cylinder head for a diesel engine which cylinder head has a combustion chamber which, when said head is mounted on its cylinder, is arranged laterally of the longitudinal axis of the cylinder and in which the fuel in well processed condition is brought into contact with the combustion air, already where the combustion air enters the combustion chamber.

It is a still further object of this invention to provide a cylinder head of the above mentioned type, in which the fuel is injected into the combustion chamber of the cylinder head in such a manner that the fuel injected into the combustion chamber is practically without any loss so deflected on the wall of the said combustion chamber that the fuel will be advantageously processed throughout its passage through the combustion chamber.

These and other objects and advantages of the invention will appear more clearly from the following specification in connection with the accompanying drawings in which:

Fig. 1 diagrammatically illustrates the upper portion of a diesel engine cylinder with the cooperating portion of a cylinder head showing the fuel injection according to the present invention.

Fig. 2 illustrates an arrangement similar to that of Fig. 1 but differing therefrom by the employment of a different type of one-hole injection nozzle.

Fig. 3 illustrates a modified combustion chamber in the cylinder head.

Fig. 4 shows a further modification of the invention having the combustion chamber eccentrically arranged with regard to the cylinder axis to such an extent that the cylinder wall is in tangential contact with the adjacent edge portion of the combustion chamber.

Fig. 5 is a still further modification of the invention according to which the combustion chamber in the cylinder overlaps the cylinder wall.

General arrangement

According to the present invention it has been found that the combustion process can be materially improved by causing the fuel in well processed condition to contact the combustion air already where the combustion air enters the combustion chamber. The main area where the combustion air enters the combustion chamber is located at that edge portion of the connecting aperture between combustion chamber and cylinder chamber which is located closest to the longitudinal axis of the cylinder. The primary feature of the invention consists in that the fuel jet is injected from that side of the combustion chamber, which is remote from the cylinder chamber, through the combustion chamber and against that wall portion of the combustion chamber which is adjacent the central longitudinal axis of the cylinder, said last mentioned wall portion and said jet forming an acute angle with each other. The advantage of this arrangement according to the invention consists in that the fuel jet already on its way through the combustion chamber evaporates on the hot combustion air and, therefore, surrounded by a vapor cloud hits that wall portion of the combustion chamber which is adjacent the central longitudinal axis of the cylinder and which subsequently guides the thus processed fuel to the main area where the combustion air enters the combustion chamber. In view of the fuel vapor cloud enveloping the fuel jet, the fuel is practically without loss, i. e., without deposit of liquid fuel particles, deflected into the combustion chamber by the wall portion thereof at the area where the combustion air enters the said combustion chamber. Thus, the fuel jet is further processed along the entire way of the combustion air through the combustion chamber and is eventually burned. It is advantageous to design the combustion chamber so that it widens toward the cylinder chamber. This widening may be in form of a cone but such shape is by no means necessary. It is merely important that the combustion chamber is so shaped that, in addition to an unrestricted connection with the cylinder chamber, it will assure a good whirling movement of the combustion air.

Structural arrangement

Referring now to the drawing in detail and Fig. 1 thereof in particular, the structure shown therein comprises the working piston 1 of the diesel engine which is reciprocably mounted in the cylinder 2. The cylinder 2 has mounted thereon a cylinder head 3 which is provided with a combustion chamber 4 arranged laterally of the central longitudinal axis of the cylinder. The said combustion chamber 4 is adapted at the upper dead center of the working piston 1 to receive nearly the entire combustion air while the working piston at its upper dead center approaches the cylinder head 3 as closely as is compatible with practical considerations. The combustion chamber 4 communicates with the cylinder chamber 5 in an unrestricted manner. The fuel is injected through a one-hole nozzle 6. The combustion chamber 4 widens cone-like toward the cylinder chamber.

The fuel jet 7 is injected from the wall 8 of the combustion chamber 4, which wall is remote from the cylinder chamber 5, through the injection chamber 4 against the wall portion 9, which is adjacent the longitudinal axis of the cylinder. The injection is effected in such a manner that the fuel jet together with the said wall portion forms an acute angle. It is advantageous when the angle formed by the fuel jet 7 and the wall portion 9 is approximately 15° or, even better, less than 15°.

According to Fig. 1, a one-hole nozzle is employed the nozzle bore 11 of which is parallel to the longitudinal axis of the nozzle. Consequently, it is necessary to arrange this nozzle 6 at an angle to the central longitudinal axis of the cylinder.

Fig. 2 shows a modification over Fig. 1 which consists primarily in the employment of a different type of nozzle. More specifically, according to Fig. 2, a one-hole nozzle 6a is employed the nozzle bore 12 of which is arranged at an angle with regard to the central longitudinal axis of the nozzle, said nozzle axis being substantially parallel to the longitudinal axis of the cylinder 2a. The other parts of Fig. 2 correspond to those of Fig. 1 and, therefore, have been designated with the same reference numerals but with the additional character a.

Referring now to Fig. 3, this figure illustrates a further modification of the invention inasmuch as the wall portion 9b of the combustion chamber 4b, which wall portion is adjacent the longitudinal axis of the cylinder 2b, is provided with a contraction 10 extending over approximately one third of the circumference of the combustion chamber 4. When taking a section passing through the central longitudinal axis of the cylinder 2b and through the longitudinal axis of the combustion chamber 4b, the said contraction which serves as deflector or baffle surface for the fuel jet 7b will appear in the shape of a round nose. In view of this round nose 10, the fuel for the oncoming combustion air is deflected in the direction of flow of the oncoming combustion air. This is highly advantageous inasmuch as in this way a further loss-free guidance of the fuel to the combustion air is obtained.

The other parts of Fig. 3 correspond to those of Fig. 1 and are, therefore, designated with the same reference numerals but with the additional character b. However, it should be noted that the nozzle 6b is of the type shown in Fig. 2 rather than the type shown in Fig. 1.

While according to the arrangements of Figs. 1 to 3 the combustion chambers 4 are only slightly eccentric with regard to the central longitudinal axis of the cylinder, it may be advantageous, in order to obtain a strong whirling movement in the combustion chamber to arrange the combustion chamber in the manner of Figs. 4 and 5 respectively.

According to Fig. 4, the combustion chamber 4c is arranged eccentrically with regard to the longitudinal axis of the cylinder 2c to such an extent that the combustion chamber opening 13 in the bottom of the cylinder head 3c is in tangential contact with or borders the adjacent cylinder wall. The nozzle 6c corresponds to the nozzle 6a of Fig. 2. All other parts corresponding to those of Fig. 1 are designated with the same reference numerals as the latter but with the additional character c.

Finally, with regard to Fig. 5, the combustion chamber 4a has been arranged so far outwardly that its opening 14 in the bottom of the cylinder 2d overlaps the cylinder wall. The remaining parts with the exception of the nozzle 6d, which is of the type of the nozzle 6a, correspond to those of Fig. 1 and are therefore designated with the same reference numerals but with the additional character d.

It is, of course, understood, that the present invention is by no means limited to the particular construction shown in the drawings but also comprises any modifications within the scope of the appended claims.

What I claim is:

1. In combination with a diesel engine having a cylinder and a piston reciprocably mounted in said cylinders: a cylinder head mounted on said cylinder and comprising a combustion chamber arranged for unrestricted communication with the cylinder chamber confined by said cylinder, said piston, and said cylinder head; said combustion chamber being adapted in the upper dead center of said piston to receive nearly all of the combustion air and being arranged laterally of the longitudinal axis of said cylinder so that the major surface portion of the top of said piston is located unilaterally of said combustion chamber; and a one hole fuel injection nozzle mounted in that wall portion of said combustion chamber which is remote from the bottom of said cylinder head, said last mentioned wal portion at least partially facing said cylinder chamber; the longitudinal axis of the nozzle bore of said nozzle being located so as to form an obtuse angle with said major surface portion of the top of said piston, thereby causing the fuel jet passing through said nozzle bore to hit at an acute angle that lower portion of the combustion chamber wall which is adjacent said major surface portion of the top of said piston, the lower edge portion of that combustion chamber wall section which is closest to said longitudinal cylinder axis being so shaped as to force at least the major portion of the incoming combustion air to begin its deflection into the combustion chamber at points only which are beyond said last mentioned lower edge portion when looking in the direction of flow of said incoming combustion air.

2. In combination with a diesel engine having a cylinder and a piston reciprocably mounted in said cylinder: a cylinder head mounted on said cylinder and together with said cylinder and piston confining a cylinder chamber adapted at the upper dead center of said piston to receive nearly all of the combustion air from said cylinder chamber, said cylinder head comprising a combustion chamber arranged laterally of the longitudinal axis of said cylinder so that the major surface portion of the top of said piston is located unilaterally of said combustion chamber; said combustion chamber being arranged to communicate through an unrestricted passage with said cylinder chamber; the longitudinal axis of said combustion chamber being arranged laterally of and substantially parallel to the longitudinal axis of said cylinder; and a nozzle arranged in that wall portion of said combustion chamber which is remote from the bottom of said cylinder head, said last mentioned wall portion at least partially facing said cylinder chamber; the axis of the bore of said nozzle being arranged at an obtuse angle with regard to that wall portion of the combustion chamber which is adjacent the longitudinal axis of said cylinder, the lower edge portion of that combustion chamber wall section which is closest to said longitudinal cylinder axis being so shaped as to force at least the major portion of the incoming combustion air to begin its deflection into the combustion chamber at points only which are beyond said last mentioned lower edge portion when looking in the direction of flow of said incoming combustion air.

3. For use in connection with a cylinder piston arrangement including a cylinder chamber of a diesel engine, the combination of: a cylinder head having a combustion chamber adapted, when said cylinder head is mounted on said cylinder piston arrangement, to communicate with said cylinder chamber in an unrestricted manner and at the upper dead center of the piston of said cylinder piston arrangement to receive nearly all of the combustion air, the axis of said combustion chamber being substantially parallel to and being located laterally of the longitudinal axis of said cylinder when said cylinder head is mounted on said cylinder piston arrangement; and a one hole nozzle mounted in that wall portion of said combustion chamber which is remote from the bottom of said cylinder head, said last mentioned wall portion at least partially facing said cylinder chamber; the longitudinal axis of the nozzle bore of said nozzle being located so as to form an obtuse angle with that bottom portion of the cylinder head which is located between the axis of said cylinder head and the longitudinal axis of said combustion chamber, thereby causing the fuel jet passing through said nozzle bore to hit at an acute angle that lower portion of the combustion chamber wall which, is adjacent the axis of said cylinder head, the lower edge portion of that combustion chamber wall section which is closest to said longitudinal cylinder axis being so shaped as to force at least the major portion of the incoming combustion air to begin its deflection into the combustion chamber at points only which are beyond said last mentioned lower edge portion when looking in the direction of flow of said incoming combustion air.

4. A cylinder head and nozzle arrangement as claimed in claim 3, in which the combustion chamber widens toward the bottom of said cylinder head.

5. A cylinder head and nozzle arrangement according to claim 3, in which the combustion chamber has the shape of a truncated cone with the bottom of said cone at the top of said cylinder.

6. The arrangement claimed in claim 1, in which that lower wall portion of the combustion chamber which is adjacent the longitudinal axis of said cylinder is provided with a constriction extending over approximately one-third of the circumference of said combustion chamber, said constriction in a section through the longitudinal axis of said combustion chamber and through the longitudinal axis of said cylinder appearing as a round nose and serving as deflection surface for the fuel jet conveyed by said nozzle.

7. An arrangement as claimed in claim 1, in which the unrestricted communication between the combustion chamber in the cylinder head and the chamber in said cylinder is effected through an opening in the bottom of said cylinder head, said opening having one marginal area bordering a portion of the cylinder wall of said cylinder.

8. An arrangement as claimed in claim 1, in which the unrestricted communication between the combustion chamber in the cylinder head and the chamber in said cylinder is effected through an opening in the bottom of said cylinder head, said opening having a portion overlapping a portion of the inner wall of said cylinder.

9. In combination with a diesel engine having a cylinder and a piston reciprocably mounted in said cylinder; a cylinder head mounted on said cylinder and comprising a combustion chamber arranged for unrestricted communication with the cylinder chamber confined by said cylinder, said piston, and said cylinder head; said combustion chamber having the shape of a truncated cone with the bottom plane of said cone flush with the bottom of said cylinder; said combustion chamber being adapted in the upper dead center of said piston to receive nearly all of the combustion air and being arranged laterally of the longitudinal axis of said cylinder; and a one-hole fuel injection nozzle mounted at least partially in the top wall of said combustion chamber and having the longitudinal axis of its nozzle bore arranged so as to form an acute angle with the bottom plane of said cylinder head, thereby causing the fuel jet passing through said nozzle to hit at an acute angle that lower portion of the combustion chamber wall which is adjacent the longitudinal axis of said cylinder, the lower edge portion of that combustion chamber wall section which is closest to said longitudinal cylinder axis being so shaped as to force at least the major portion of the incoming combustion air to begin its deflection into the combustion chamber at points only which are beyond said last mentioned lower edge portion when looking in the direction of flow of said incoming combustion air.

References Cited in the file of this patent

UNITED STATES PATENTS

| | | |
|---|---|---|
| 740,195 | Soeldner | Sept. 29, 1903 |
| 1,527,861 | Ginty | Feb. 24, 1925 |
| 1,622,885 | Ricardo | Mar. 29, 1927 |
| 2,089,577 | Sanders | Aug. 10, 1937 |
| 2,315,907 | Starr | Apr. 6, 1943 |

OTHER REFERENCES

Ser. No. 332,506, Nallinger et al. (A. P. C.), published May 11, 1943.